Sept. 10, 1968     P. FRENCH ET AL     3,401,287
VARIABLE RELUCTANCE DYNAMOELECTRIC MACHINES
Filed May 2, 1966

INVENTORS
Park French
John T. Venaleck

BY                                    ATTORNEYS

United States Patent Office 3,401,287
Patented Sept. 10, 1968

3,401,287
VARIABLE RELUCTANCE DYNAMOELECTRIC
MACHINES
Park French, Aurora, and John T. Venaleck, Mentor,
Ohio, assignors to TRW Inc., Cleveland, Ohio, a corporation of Ohio
Filed May 2, 1966, Ser. No. 546,747
6 Claims. (Cl. 310—168)

The present invention relates to variable reluctance dynamoelectric machines, and components therefor, and more specifically, to disk assemblies used as rotors and stators in axial gap variable reluctance machines.

The improvements of the present invention are applicable to the type of variable reluctance machine in which a shaft carries a plurality of spaced disk rotor elements which are in interleaved or interdigitated relationship with a plurality of stator disks. Both the rotor disks and the stator disks can have very similar structures, each consisting of a plurality of alternating magnetic and non-magnetic sectors radiating from either a hollow center or a non-magnetic core. As the rotor rotates relative to the stator, variable reluctance paths are set up axially of the machine and, with suitable switching circuitry, the machines can operate as motors by the introduction of current pulses through the associated windings when the axial reluctance is decreasing, and act as generators when the current pulses are applied at a time when the axial reluctance is increasing.

One of the objects of the present invention is to provide an improved disk construction for axial gap variable reluctance machines having good electrical performance as well as substantial mechanical rigidity.

Another object of the invention is to provide rotors and stators for variable reluctance dynamoelectric machines which can be fabricated of readily available materials at a reasonable cost.

Still another object of the invention is to provide improved rotor and stator assemblies for axial gap variable reluctance dynamoelectric machines which can be made in a wider range of configurations than is possible with presently used materials.

The basic principles of operation of the machines can be understood from the following simplified disclosure, considering a machine possessing a magnetic circuit which changes cyclically in reluctance with the rotation of a shaft coupling the device to a mechanical load or a source of power. The behavior of this type of machine can be conveniently discussed on the basis of magnetic coenergy.

In terms of the vector field $\bar{H}$ and the vector flux density $\bar{B}$, the coenergy of such a system is as follows:

$$E_c = \frac{1}{4\pi} \int_V \bar{B} \cdot d\bar{H} \quad (1)$$

where V is the system volume over which the integration is carried. For a magnetic circuit which undergoes a change in configuration under constant magnetomotive force, the change in coenergy represents the difference between the energy supplied by the source of magnetomotive force and the change in stored magnetic energy. This change in coenergy therefore is identical with the mechanical energy produced, and can be used in calculating mechanical quantities.

The coenergy theory can be used in the calculation of forces and torques. In generalized terms, these quantities are calculated from the form as follows:

$$F_i = \frac{\partial E_c}{\partial x_i} \quad (2)$$

where $F_i$ is a generalized force and $x_i$ is the generalized displacement conjugate to that force.

Output torque, which depends on the change of coenergy with rotor displacement, is roughly proportional to the coenergy of the active section. The coenergy exists principally in the air gaps between the rotor and stator magnetic sectors and within the sectors themselves. Generally speaking, highly permeable materials possess small coenergies, resulting in the gap coenergies being predominant. Conversely, low permeability materials can cause the major portion of the coenergy to exist within the magnetic sectors, and yield high coenergies per unit of excitation power. From the above, it will be seen that both the coenergies per unit volume and per unit excitation power vary with materials and with the geometry of the sectors and air gaps.

In other applications assigned to the same assignee as the present application, it was suggested that the magnetic sectors could consist of powdered iron. In order to suppress eddy currents, the powdered iron particles were coated with an insulating or low conductivity material and mixed with a small quantity of binder. Pieces of the desired shape were then made by pressing the material into appropriately shaped molds under very high pressures. This manufacturing method is very low in cost and provides magnetic sectors which can be operated at flux densities up to approximately 17 kilogauss. When operated at such high flux densities, the pressed powder material drops to low permeability values (approximately 10) and develops substantial magnetic coenergy values. The design of such machines, however, was limited to rather specific geometries in the rotor and stator configurations.

The present invention makes use of laminated strips of a high permeability magnetic material such as silicon steel or the like in the disk construction. The use of such strips provides the possibility of a much wider range of configurations than is available with powdered magnetic materials. The sheets of ribbons are made thin and insulated from each other to suppress eddy current losses, and are then spirally wound about a core. The high permeability of the laminated sheet materials causes virtually all of the active section coenergy to exist in the overlap regions of the air gaps between the rotor and stator magnetic sectors. The air gap overlap regions are thus the principal determinants of machine performance, and since their number and volume are at the disposal of the designer, wide variations in machine properties can be obtained. For example, making the air gaps short compared to the disk thickness results in low excitation losses and moderate torque output. Machines incorporating this design feature exhibit moderate powers per unit weight at very high efficiencies. Making the disks as thin as possible from a structural standpoint, making the air gap lengths approximately ½ the disk thickness, and making the magnetic sector mean width approximately equal to the disk thickness results in a machine which has a maximum torque per unit weight. Similarly, the power factor can be varied by changing the sector width to gap length ratio.

A further description of the present invention will be made in conjunction with the attached sheet of drawings which illustrate several embodiments thereof.

Figure 1:
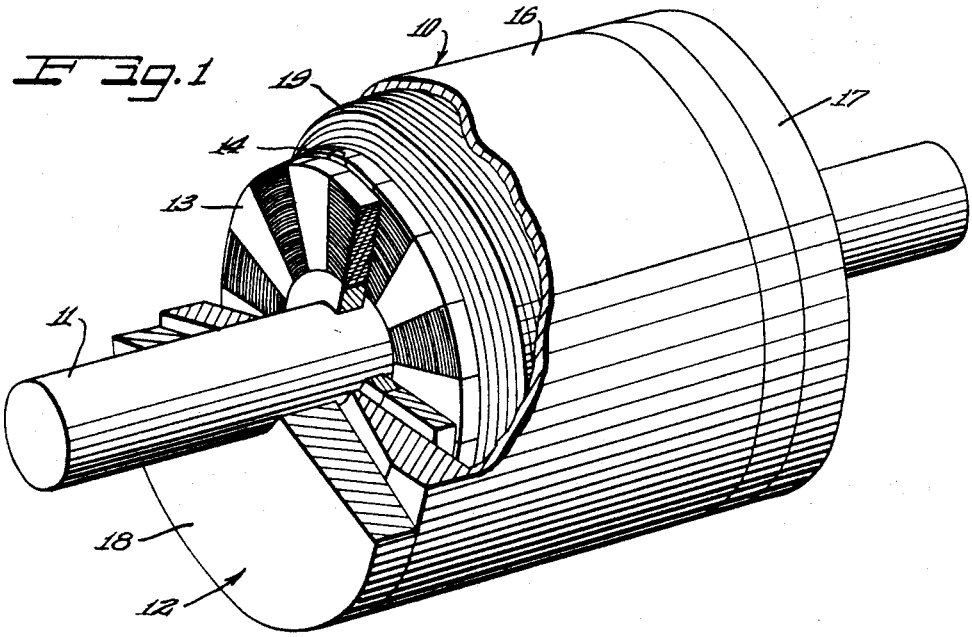
FIGURE 1 is a view in perspective partially broken away to illustrate the overall construction of a machine of the type with which the present invention is concerned.

In FIGURE 1, reference numeral 10 indicates generally a dynamoelectric variable reluctance machine. A centrally disposed shaft 11 is mounted for rotation within a casing generally indicated at reference numeral 12.

The shaft 11 carries a series of axially spaced rotor disks 13 positioned between a set of stator disks 14 in interleaved or interdigitated relationship. The machine has a cylindrical flux return section 16 coaxial with the shaft 11. The flux return paths at the end of the casing are provided by spaced end plates 17 and 18 forming part of the casing.

An axial magnetic field is provided by an excitation coil 19 in circumscribing relationship to the stator disks 14.

Because the present invention is directed specifically to the construction of the rotor and stator disks, we have not gone into the various types of excitation coil assemblies which can be used. Nor have we shown a switching circuit which applies current pulses periodically in timed relation to the variations in axial reluctance occurring in the machine, since such circuitry has been described in other copending applications assigned to the present assignee and form no part of the present invention.

For the present purposes, it will suffice to say that the rotor disks 13 and 14 each include alternating sectors of magnetic and non-magnetic materials (or high permeability and substantially lower permeability sections). When the rotor is turned, its magnetic sectors alternately align themselves with the magnetic and non-magnetic portions of the stator. The variation in reluctance to an axial magnetic field induced in the coil 19 can be made very large by this action. The alternating field is applied as the axial reluctance is decreasing, the rotor is pulled into alignment with the stator, after which the magnetic circuit is allowed to coast to the open position under low or zero field conditions. This action delivers a rotational force to the rotor, providing motor action. Similarly, applying the field while the magnetic reluctance is increasing requires a torque input through the rotor shaft, providing generator action.

Figure 2:
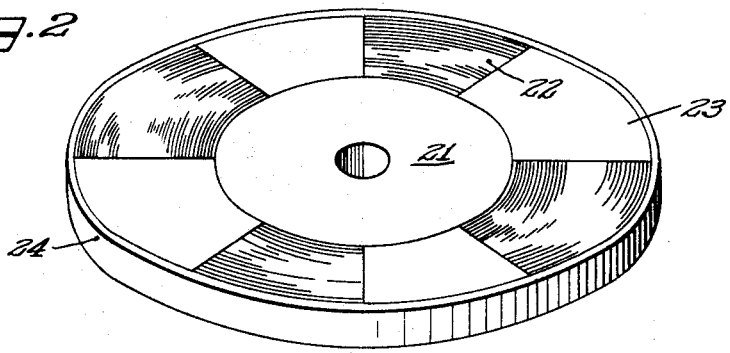
FIGURE 2 is a view in perspective of a rotor assembly embodying the principles of the present invention.
Figure 3:
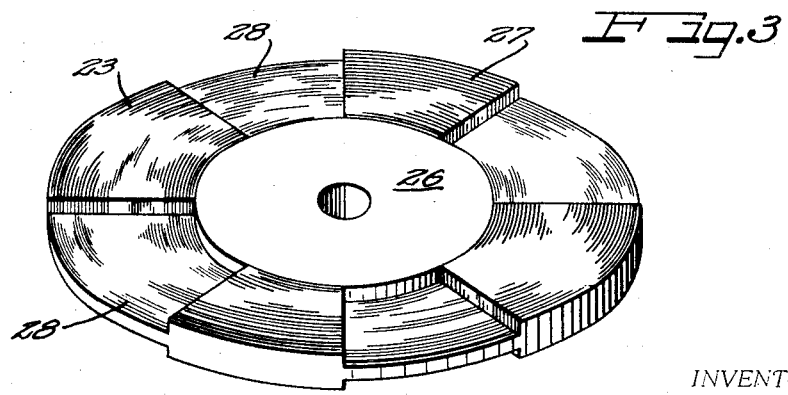
FIGURE 3 is a perspective view of a modified form of rotor assembly which can be used.

The present invention is particularly concerned with an improved disk element construction of the types shown in FIGURES 2 and 3. Those two figures illustrate two forms of rotor constructions which make use of the improvements of the present invention. In FIGURE 2, there is illustrated a rotor structure which includes a core 21 of a non-magnetic material. Initially, a ribbon or strip of a high permeability magnetic material such as high silicon steel is wound about the core 21 in spiral convolutions. Then, a suitable inert resin (non-conductive and non-magnetic) such as an epoxy resin or the like is applied over the resultant windings, and allowed to harden, thereby providing a rigid structure. This bonded laminate is then machined to provide equal width sectors circumferentially spaced about the periphery of the core 21. The magnetic sectors remaining after such machining have been illustrated at reference numeral 22. In the spaces between the sectors 22, a suitable potting resin such as an epoxy resin is molded in place, providing non-magnetic sectors 23 between the magnetic sectors.

As evident from the foregoing, the magnetic sectors 22 consist of arcuate strips of magnetic material of progressively greater arcuate length extending radially outwardly from the core 21 and being bonded together by the original impregnant.

While not usually necessary, it is possible to employ a rim 24 of a non-magnetic material, composed of materials such as bonded glass fibers or thin, non-magnetic metal. The rim provides hoop strength, where required. In the event that the rim is composed of a spirally wound metal with interlaminar insulation, care should be taken in securing the ends of the ribbon so that the rim does not constitute a shorted electrical loop. Otherwise, large eddy current losses may result.

The structure shown in FIGURE 3 is similar in many respects to that shown in FIGURE 2. It includes a core 26 composed of a non-magnetic material about which there is trained a ribbon of insulated magnetic material. After the ribbon has been trained over the core 26, the ribbon is impregnated with a suitable resinous bonding agent. Then, spaced areas are relieved by machining or the like to provide magnetic sectors 27 of relatively high magnetic permeability and sectors 28 of considerably lower magnetic permeability. The axial dimension of the relieved sectors 28 may be about ¼ or so the axial dimension of the magnetic sectors 27. This type of construction provides adequate strength for moderate speed operation without a rim, but a rim can be added for high speed operation. If required from a noise or hydrodynamic standpoint, the relieved portions 28 may be filled with a magnetically inert material.

In order to reduce the possbility of shorting, holes may be drilled axially through the laminations to interrupt possible electrical loops. Drilling in a manner which limited laminae to less than one full turn has been found to be completely successful in preventing shorted loops.

From the foregoing, it will be understood that the disk element construction of the present invention provides an efficient but economical rotor or stator structure for axial gap variable reluctance dynamoelectric machines.

It should be evident that various modifications can be made to the described embodiments without departing from the scope of the present invention.

We claim as our invention:

1. In a variable reluctance dynamoelectric machine, a disk element structure comprising a non-magnetic core, an insulated magnetic strip spirally wound on said core, and an electrically inert resin bonding the windings of said strip into a coherent laminated structure.

2. The disk element structure of claim 1 in which the wound strip is relieved along spaced sectors extending from said core.

3. The disk element structure of claim 1 in which said strip is severed into individual magnetic sectors extending outwardly from said core, the spaces between the sectors being filled with an electrically inert resin.

4. A rotor structure for a dynamoelectric machine of the variable reluctance type comprising a non-magnetic core, and a plurality of alternating magnetic and non-magnetic sectors extending radially outwardly from said core, said magnetic sectors each consisting of arcuate strips of magnetic material of progressively greater arcuate length, and being held length, and being held together by a resinous bonding agent, the non-magnetic sectors consisting solely of resin.

5. The rotor structure of claim 4 which also includes a peripheral rim about said rotor.

6. A rotor structure for a dynamoeltctric machine of the variable reluctance type comprising a non-magnetic core, and an insulated magnetic strip spirally wound about said core, said strip being relieved in spaced areas to provide alternating sectors of relatively high magnetic permeability and relatively low magnetic permeability.

References Cited

UNITED STATES PATENTS

| | | | |
|---|---|---|---|
| 579,012 | 3/1897 | Scheeffer | 310—168 |
| 2,438,629 | 3/1948 | Anderson | 310—268 |
| 3,284,651 | 11/1966 | Wesolowski | 310—168 |

MILTON O. HIRSHFIELD, *Primary Examiner.*

L. L. SMITH, *Assistant Examiner.*